United States Patent [19]

Gunnell et al.

[11] 4,162,287
[45] Jul. 24, 1979

[54] APPARATUS FOR PELLETING FLOCCULENT PARTICLES

[75] Inventors: Thomas J. Gunnell; Paul D. Hann, both of Bartlesville, Okla.

[73] Assignee: Phillips Petroleum Company, Bartlesville, Okla.

[21] Appl. No.: 870,682

[22] Filed: Jan. 23, 1978

[51] Int. Cl.$^2$ ............................................. C09C 1/56
[52] U.S. Cl. ................................... 264/117; 425/222; 422/242; 422/256
[58] Field of Search ........................ 425/222; 264/117; 23/252 R, 259.5–259.8

[56] References Cited

U.S. PATENT DOCUMENTS

| Re. 21,379 | 3/1940 | Glaxner | 425/222 X |
|---|---|---|---|
| 2,924,847 | 2/1960 | Keiding et al. | 425/222 X |
| 3,597,170 | 8/1971 | Dollinger | 425/222 X |
| 4,010,001 | 3/1977 | Dollinger | 425/222 X |

FOREIGN PATENT DOCUMENTS

| 73250 | 3/1943 | Czechoslovakia | 264/117 |
|---|---|---|---|
| 445457 | 12/1974 | U.S.S.R. | 425/222 |
| 518367 | 7/1976 | U.S.S.R. | 425/222 |

Primary Examiner—Robert L. Spicer, Jr.

[57] ABSTRACT

Particles being pelleted, e.g., flocculent carbon black being pelleted with water, are passed through alternating zones of increasing and decreasing pressure. An apparatus is disclosed in which a cylindrical shell comprises a rotatable shaft located substantially on the longitudinal axial center line of the shell. The shaft has pins positioned thereon forming at least one helix with alternate decreasing and increasing pitches along the helix thus to effect compression and expansion actions on the mass in the pelleter, thereby producing a narrow size range of pellets.

3 Claims, 2 Drawing Figures

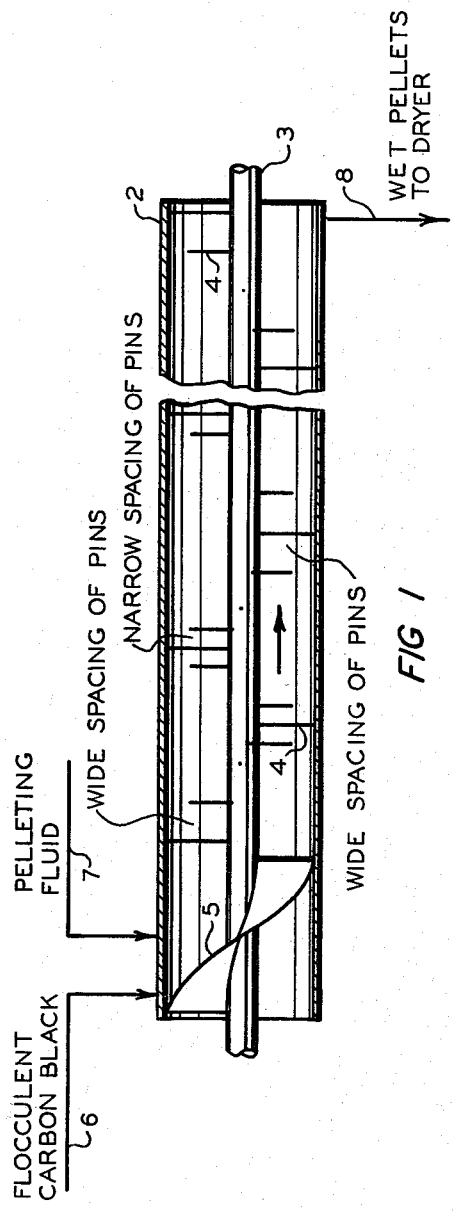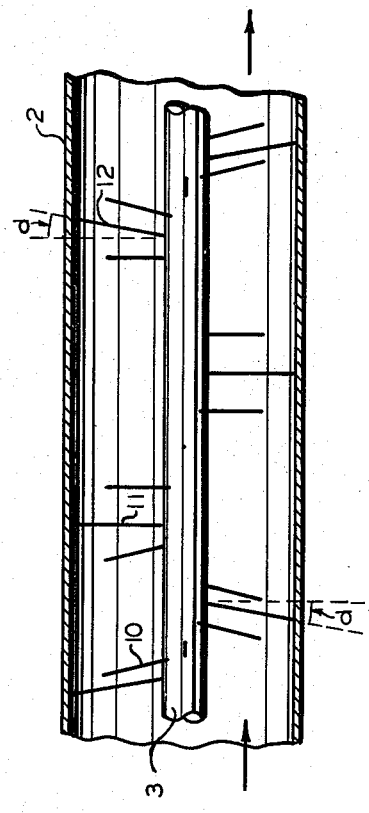

APPARATUS FOR PELLETING FLOCCULENT PARTICLES

This invention relates to pelleting particles, e.g., flocculent carbon black. In one of its aspects the invention relates to a method for pelleting a mass of particles, e.g., carbon black. In another of its aspects the invention relates to an apparatus for pelleting a mass of particles, e.g., flocculent carbon black.

In one of its concepts the invention provides a method for alternately compressing and expanding a mass of particles being pelleted which comprises passing the particles through a zone having a rotating helical pelleting element therein, said element having at least one decreasing and one increasing pitch thereof. In another of its concepts the invention provides a pelleting apparatus having a rotating shaft, said shaft having a helix formed by pins affixed to said shaft and said helix having at least one increasing and one decreasing pitch thereof.

The pelleting of carbon black or other particles is well known. Ordinarily, a flocculent mass of carbon black is pelleted to densify the same and to increase ease of handling. The pelleting is ordinarily accomplished in a so called wet-pelleter which, for purposes of the present invention, can be described as a longitudinally disposed cylindrical shell having a rotating shaft therein, said shaft having thereon a plurality of tines extending therefrom toward, but not completely, to the inner wall of the shell. The carbon black and pelleting fluid, usually water, are passed into one end of the shell and through the shell to the other end and are pelleted by action of the tines beating against the carbon black in the water, thus causing intimate contact with ensuing pelleting.

We have now conceived a method and apparatus for pelleting particles, e.g., flocculent carbon black, by causing the pellets and pelleting fluid to be alternately compressed and decompressed. This we have conceived can be done by varying the pitch of the helix of tines or pins disposed along the usual carbon black pelleter device shaft, normally carrying said tines or pins. The method and apparatus of this invention result in pellets having a narrower size distribution range.

An object of the invention is to provide a method for pelleting a particle, e.g., carbon black. Another object of the invention is to provide an apparatus for pelleting a particulate mass, e.g. flocculent carbon black. A further object of the invention is to so pellet a mass of particles as to densify or to compact the same. It is still a further object of the invention to produce pelleted particles having a narrow size distribution range.

Other aspects, concepts, objects and several advantages of the invention are apparent from a study of the foregoing disclosure, drawing and the appended claims.

According to the present invention a particulate mass, e.g., flocculent carbon black, is wet pelleted by passing the same through alternate zones of increasing and decreasing pressure or compression. In one embodiment of the invention the alternate zones of increasing and decreasing compression are provided by respectively decreasing and increasing pitches along the otherwise conventional rotating shaft within a wet pelleter having a helix of pins or tines thereon.

The alternate increasing and decreasing compression produces an action like unto a pumping action.

Generally wet pelleting flocculent carbon black is effected using a pelleting liquid which can be an aqueous liquid or an oil-water emulsion. The aqueous liquid can be used in a water-to-carbon black weight ratio of about 2 to 1 to about 1 to 2, depending upon the type of black being pelleted.

Pelleting aids can be used which aids are well known in the art, and include such as molasses, calcium lignin sulfonate, etc. These aids are added in an amount of about 0.1 to about 5 weight percent of the water used.

Pelleter shaft rotation usually is in the range of 150 to about 600 revolutions per minute. The pelleting temperature is usually in the range of about 60° F. to about 200° F.

In some operations an oxidant such as $HNO_3$, known in the art, can be added to the pelleting water in an amount up to about 5 or so weight percent $HNO_3$ in the water. Subsequent conventional drying of the pellets effects some oxidation, resulting in slow-curing "S"-type blacks, desired in some rubber blends.

According to the invention, the flow of flocculent carbon black and pelleting fluid into the wet pelleter of the invention is normally at a fixed weight rate; and the wet pellets are removed from the pelleter normally at this same fixed rate, so that the mass entering the pelleter equals the mass exiting the pelleter.

Within the pelleter of the invention, the mass flows from the inlet end to the outlet end, and the pins affixed to the rotating shaft effect a physical agitation of the mass, producing the wet carbon black pellets therein.

The mass passes through zones of variably axially-spaced tines or pins; for example, pins alternately fairly closely spaced along the shaft and pins fairly distantly spaced along the shaft. As the mass travels through the pelleter passing through zones, wherein the pin density per linear distance along the pelleter alternately decreases and increases, the energy imparted to the pelleting particles, that is, the admixing of the carbon black and the pelleting fluid, is effected so that these masses are brought together to form wet carbon black pellets of particle sizes having a narrow range of size distribution, as desired.

In this invention, there is produced alternate increases and decreases of the number of pins or tines per linear distance along the pelleter which impart alternate changes of energy to the pellet-forming mass and the produced wet pellets.

Referring now to the drawing,

FIG. 1 shows in vertical cross section a longitudinally disclosed wet pelleter apparatus.

FIG. 2 shows a section of such a pelleter apparatus wherein tines are variously inclined.

Referring now to FIG. 1, pelleter shell 2 is equipped with rotatable shaft 3 having tines 4 thereon. Auger 5 propels flocculent carbon black introduced by 6 and pelleting fluid, i.e., water, introduced by 7 through shell 2 and out from shell 2 at 8. Wet pellets removed at 8 are conventionally dried.

According to the invention, as can be seen, there is a wide spacing of pins and a narrow spacing of pins and these spacings are alternated along a substantial length of the shaft. Thus, the pitch of the helix varies along the flight of pins to give effect of compression and expansion of the mass in the pelleter.

Only one helix has been shown for sake of simplicity of the drawing.

Referring now to FIG. 2, tines 10 are slanted, tines 11 are substantially at right angles to the longitudinal axis of the shaft, and tines 12 are slanted. It will be noted that tines 10 and 12 are slanted away from each other. Generally, the tines or pins can be slanted variously and also can be variously shaped. The slant angle $\alpha$ ranges from up to about 10 degrees upstream to up to about 10 degrees downstream, the angles measured with respect to an imaginary plane passed perpendicularly to the longitudinal axis of the shaft 3.

Consideration of the motion of the particles along the tines or pins will show that the pins, depending upon whether the mass is under compression or decompression, will move particles toward or away from the shaft to an extent causing an intersecting mixing motion.

The following is a calculated example according to the invention.

| "Calculated Example" | Specific | Typical |
|---|---|---|
| Pelleter Shell: | | |
| Length, inches, | 110 | 48 to 200 |
| Diameter, inches, | 19.5 | 12 to 30 |
| Pelleter Shaft (not including auger): | | |
| Length (First to Last Pin), inches, | 88 | 24 to 175 |
| Diameter of Shaft, inches, | 6.625 | 4 to 8 |
| Pins: | | |
| Diameter, inches | 0.625 | 0.5 to 1.5 |
| Distance of Tip to Inner Shell, inches | 0.1875 | 0.0625 to 0.5 |
| Centerline Spacing of Pin to Next Adjacent Pin in Same Helix | see (a) below | see (a) below |
| Azimuthal Angle of Adjacent Pin in Helix | 22 ½° | 11¼° to 45° |
| Number of Helixes, (b) | 2 | 1 to 6 |
| Helix, Changes in Pitch, (a) | 2 | 2 to 12 |

(a) The spacing from one pin to an adjacent pin on the same helix can vary from one to six inches; several adjacent pins can be equally spaced. A next series of several pins can be equally spaced, but at a different spacing from the first set, etc. Specifically, in the example the adjacent pins on each helix are spaced, center-to-center, 1½ inches for the first 16 pins, for one complete 360° of the helix; then at 2½ inches for the next 16 pins; and back to 1½ inches for the last 16 pins, effecting 2 incremental changes in pitch of the helix along the shaft, giving compression and expansion action on the mass in the pelleter. 3 pitches are used, but 2 changes in pitches result.

It is noted that a gradual change in pitch can be used; that is, the adjacent pins on the helix can gradually increase, say, from 1½ inches to, say, 2½ inches, and back gradually to 1½ inches, etc. The axially spacing of pins in each "run of helix" do not have to be 1½ to 2½ to 1½, but can all be different, smaller, larger, smaller, etc.

(b) Symetrically mounted on shaft; two helixes are 180° apart; three are 120° apart; four are 90° apart, etc.

The specific run can continuously process 1600 pounds of N762 flocculent black per hour using 900 pounds per hour of pelleting water containing 1.5 weight percent calcium lignin sulfonate. The shaft is run at 325 RPM, and pelleting is effected at 150° F. The wet pellets are continually passed from this pelleter to a conventional dryer operated so that drying occurs at 400° F. to leave only about 0.5 wt. percent water in the produced dried pellets. The above values are merely illustrative, and not limiting.

Reasonable variation and modification are possible in the scope of the foregoing disclosure, the drawing and the appended claims to the invention the essence of which is that there have been provided a method and apparatus for pelleting particles, e.g., flocculent carbon black, as with water or other fluid to compact or densify the same for ease of shipping and handling. The method comprising essentially, subjecting the particles to the action of pins or tines mounted upon a rotating shaft within a pelleter. The pins or tines being arranged in a helix of variable pitch, as described; and the apparatus essentially comprising the arrangement of pins or tines, also as described.

We claim:

1. A method for pelleting a mass of particles, e.g., flocculent carbon black, which comprises subjecting said particles to a compression and decompression by passing said particles through a pelleting zone wherein a helix of tines is arranged to have a variable pitch, the pitch having alternate decreasing and increasing values along the helix, thus, to effect compression and expansion action on the mass in the pelleter.

2. A method according to claim 1 wherein the variable pitch is accomplished by alternate wide and then narrow spacing of the tines.

3. An apparatus for pelleting a mass of particles, e.g., carbon black, as with water which comprises essentially an elongated shell, a pin-equipped rotating shaft based substantially, axially in said shell, and said pins having alternate wide spacings and then narrow spacings to alternately vary the pressure upon the mass being pelleted.

* * * * *